United States Patent
Noguchi et al.

(10) Patent No.: US 9,461,335 B2
(45) Date of Patent: Oct. 4, 2016

(54) LITHIUM SECONDARY BATTERY

(71) Applicant: NEC Corporation, Tokyo (JP)

(72) Inventors: Takehiro Noguchi, Tokyo (JP); Hideaki Sasaki, Tokyo (JP); Yuukou Katou, Tokyo (JP); Makiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 14/382,429

(22) PCT Filed: Feb. 26, 2013

(86) PCT No.: PCT/JP2013/055019
§ 371 (c)(1),
(2) Date: Sep. 2, 2014

(87) PCT Pub. No.: WO2013/129428
PCT Pub. Date: Sep. 6, 2013

(65) Prior Publication Data
US 2015/0132663 A1    May 14, 2015

(30) Foreign Application Priority Data

Mar. 2, 2012  (JP) .................. 2012-047401

(51) Int. Cl.
*H01M 10/0569* (2010.01)
*H01M 10/0525* (2010.01)
(Continued)

(52) U.S. Cl.
CPC ........ *H01M 10/0569* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2012/0214073 A1*  8/2012  Iwaya .............. H01M 10/0525
429/338

FOREIGN PATENT DOCUMENTS

JP    08-037024    2/1996
JP    09-007635    1/1997
(Continued)

OTHER PUBLICATIONS

International Search Report mailed May 14, 2013 in corresponding PCT application.

*Primary Examiner* — Sarah A Slifka
(74) *Attorney, Agent, or Firm* — Finnegan, Henderson, Farabow, Garrett & Dunner LLP (57) ABSTRACT

There is provided a secondary battery comprising: a positive electrode capable of intercalating and deintercalating a lithium ion; a negative electrode capable of intercalating and deintercalating a lithium ion; and an electrolytic solution, wherein the electrolytic solution comprises: a fluorine-containing cyclic ether compound represented by the following formula (1); and at least one selected from a fluorine-containing chain ether compound or a fluorine-containing phosphate ester compound;

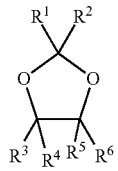

(1)

wherein $R^1$ to $R^6$ are each independently selected from a hydrogen atom, a fluorine atom, a chlorine atom, or a fluorine-substituted, chlorine-substituted, or unsubstituted alkyl group, and at least one of $R^1$ to $R^6$ is selected from a fluorine atom or a fluorine-substituted alkyl group.

13 Claims, 1 Drawing Sheet

(51) Int. Cl.
*H01M 10/0567* (2010.01)
*H01M 4/505* (2010.01)
*H01M 4/525* (2010.01)
*H01M 4/58* (2010.01)

(52) U.S. Cl.
CPC ..... *H01M10/0525* (2013.01); *H01M 10/0567* (2013.01); *H01M 4/5825* (2013.01); *H01M 2220/30* (2013.01); *H01M 2300/004* (2013.01); *H01M 2300/0034* (2013.01); *Y02E 60/122* (2013.01)

(56) References Cited

FOREIGN PATENT DOCUMENTS

| | | |
|---|---|---|
| JP | 2001-210332 | 8/2001 |
| JP | 2003-297420 | 10/2003 |
| JP | 3557724 | 8/2004 |
| JP | 4098997 | 6/2008 |
| JP | 2010-146740 | 7/2010 |
| JP | 2011-49157 | 3/2011 |
| JP | 2011-113822 | 6/2011 |
| WO | WO 2009/133899 A1 | 11/2009 |
| WO | WO 2011/052605 | 5/2011 |

* cited by examiner

LITHIUM SECONDARY BATTERY

CROSS-REFERENCE TO RELATED PATENT APPLICATIONS

This application is a National Stage Entry of International Application No. PCT/JP2013/055019, filed Feb. 26, 2013, which claims priority from Japanese Patent Application No. 2012-047401, filed Mar. 2, 2012. The entire contents of the above-referenced applications are expressly incorporated herein by reference.

TECHNICAL FIELD

The present invention relates to a lithium secondary battery.

BACKGROUND ART

A lithium secondary battery is widely used for a portable electric device, a personal computer and the like. While reduction in size and weight of the lithium secondary battery is required, it is an important subject to increase energy density. Various methods for increasing energy density of a lithium secondary battery have been examined, and among them, it is one of effective methods to raise an operation voltage of the battery.

In the case of a lithium secondary battery using cobalt acid lithium or manganese acid lithium as a positive electrode active material, the average operation voltage is 3.6 to 3.8 V (4 V class) versus lithium metal. This operation voltage is defined by oxidation-reduction reaction of cobalt ion or manganese ion ($Co^{3+} \leftarrow\rightarrow Co^{4+}$ or $Mn^{3+} \leftarrow\rightarrow Mn^{4+}$). On the other hand, a spinel compound (e.g. $LiNi_{0.5}Mn_{1.5}O_4$), in which a part of manganese is substituted with nickel or the like in manganese acid lithium, shows a potential plateau in the area of 4.5 V or more. Therefore, when such a spinel type compound is used as a positive electrode active material, a higher operation voltage (5 V class) can be achieved. In a positive electrode using this spinel compound, manganese exists in a tetravalent state, and the operation voltage of the battery is defined by oxidation-reduction of $Ni^{2+} \leftarrow\rightarrow Ni^{4+}$ instead of oxidation-reduction of $Mn^{3+} \leftarrow\rightarrow Mn^{4+}$.

For example, the capacity of the above-mentioned $LiNi_{0.5}Mn_{1.5}O_4$ is 130 mAh/g or more, and the average operation voltage is 4.6 V or more versus metal lithium. That is, a lithium intercalation capacity of $LiNi_{0.5}Mn_{1.5}O_4$ is small but its energy density is high compared with $LiCoO_2$. Therefore, the spinel compound such as $LiNi_{0.5}Mn_{1.5}O_4$ is promising as a positive electrode material with high energy density. However, when the spinel compound such as $LiNi_{0.5}Mn_{1.5}O_4$ is used as a positive electrode active material, while high operation voltage is obtained, decomposition reaction of an electrolytic solution easily advances at a contact portion of the positive electrode and the electrolytic solution. Since gas is generated by this decomposition reaction, problems in practical use occur such as an increase in inner pressure of a cell in a cycle operation or the occurrence of swelling of a lamination cell. Moreover, due to decomposition of the electrolytic solution, there was also the problem of a decrease in capacity and cycle characteristic.

On the other hand, although a carbonate-based material is generally used as a solvent of an electrolytic solution, a secondary battery using this electrolytic solution had a feature that gas generation and capacity degradation accompanied by the above-described decomposition of electrolytic solution in a cell was remarkable in high-voltage operation and long-term operation at a high temperature.

Various fluorine-containing ether compounds are also used as an electrolytic solution or a material of ion conductor for a secondary battery. The patent literatures 1 and 2 describe a secondary battery using an electrolytic solution which contains a fluorine-containing cyclic ether. Further, they describe that when an electrolytic solution contains a fluorine-containing cyclic ether, it is presumed to allow for life improvement by accumulating the fluorine-containing cyclic ether on a negative electrode and by generating a film.

Moreover, the patent literature 3 describes that a life is improved by using a mixed solvent containing a fluorine-containing cyclic ether as an electrolytic solution, and describes only example of a mixed solvent of fluorine-containing cyclic ether mixed with ethylene carbonate or sulfolane.

CITATION LIST

Patent Literature

Patent Literature 1: Japanese Patent Laid-Open No. H08 (1996)-037024
Patent Literature 2: Japanese Patent No. 4098997
Patent Literature 3: Japanese Patent No. 3557724

SUMMARY OF INVENTION

Technical Problem

However, the patent literatures 1 and 2 do not describe an example of combination use of an electrolytic solution containing a fluorine-containing cyclic ether with a positive electrode active material which operates at a high potential, and they do not describe an effect on the positive electrode side which operates at a high potential, either.

Moreover, when the electrolytic solution containing the mixed solvent described in the patent literature 3 is used in combination with a positive electrode material which operates at a very high potential of 4.5 V or more versus lithium, effects of improvement in life characteristic and of reduction of gas generation are insufficient, and further improvement is required.

Thus, an object of the present invention is to provide a lithium secondary battery having excellent cycle characteristic and high energy density, in which decomposition of an electrolytic solution is fully suppressed.

Solution to Problem

According to one aspect of the present invention, there is provided a lithium secondary battery comprising:

a positive electrode capable of intercalating and deintercalating a lithium ion, a negative electrode capable of intercalating and deintercalating a lithium ion, and an electrolytic solution, wherein the electrolytic solution comprises: a fluorine-containing cyclic ether compound represented by the following formula (1):

(1)

wherein $R^1$ to $R^6$ are each independently selected from a hydrogen atom, a fluorine atom, a chlorine atom, or a fluorine-substituted, chlorine-substituted, or unsubstituted alkyl group, and at least one of $R^1$ to $R^6$ is selected from a fluorine atom or a fluorine-substituted alkyl group, and at least one selected from a fluorine-containing chain ether compound or a fluorine-containing phosphate ester compound.

Advantageous Effects of Invention

According to the embodiment of the present invention, there can be provided a high-density lithium secondary battery having excellent cycle characteristic, in which generation of an internal gas is suppressed.

DESCRIPTION OF EMBODIMENTS

The lithium secondary battery according to the embodiment of the present invention comprises: a positive electrode that can intercalate and deintercalate a lithium ion; a negative electrode that can intercalate and deintercalate a lithium ion; and an electrolytic solution. This electrolytic solution contains a fluorine-containing cyclic ether compound represented by the above-mentioned formula (1) in a solvent of the electrolytic solution, and further contains at least one selected from a fluorine-containing chain ether compound or a fluorine-containing phosphate ester compound. Life characteristics of the secondary battery can be improved by using the electrolytic solution containing such a fluorine-containing compound. In particular, the lithium secondary battery according to the embodiment of the present invention can suppress gas generation caused by decomposition of the electrolytic solution arisen from the positive electrode material at high potential, and therefore it can prevent a problem caused by an increase in internal pressure of the cell and swelling of the cell associated with gas generation. As a result, the lithium secondary battery having excellent cycle characteristics and high energy density can be provided.
(Electrolytic Solution)

The electrolytic solution used for the secondary battery of the present invention contains a fluorine-containing cyclic ether compound represented by the above-mentioned formula (1) and, further, at least one selected from a fluorine-containing chain ether compound or a fluorine-containing phosphate ester compound.

The fluorine-containing cyclic ether compound represented by the formula (1) has two ether groups. Thereby, since a boiling point of the electrolytic solution is high and a melting point is low, it is possible to enlarge a temperature range which is operable as a secondary battery. Moreover, by using the fluorine-containing cyclic ether compound represented by the formula (1) as a solvent of an electrolytic solution, it becomes possible to improve oxidation resistance of the electrolytic solution. Especially in a battery using a positive electrode active material which operates at a high electric potential, decomposition of the electrolytic solution can be suppressed and good life characteristic can be obtained.

In the formula (1), $R^1$ to $R^6$ are each independently selected from a hydrogen atom, a fluorine atom, a chlorine atom, or a fluorine-substituted, chlorine-substituted, or unsubstituted alkyl group, and at least one of $R^1$ to $R^6$ is a fluorine atom or a fluorine-substituted alkyl group. A fluorine-substituted alkyl group means an alkyl group in which at least one hydrogen atom is substituted with a fluorine atom, and all of hydrogen atoms may be substituted with fluorine atoms. A chlorine-substituted alkyl group means an alkyl group in which at least one hydrogen atom is substituted with a chlorine atom, and all of hydrogen atoms may be substituted with chlorine atoms. In the above-mentioned formula (1), $R^1$ to $R^6$ may be mutually the same or different.

In the above-mentioned formula (1), when any of $R^1$ to $R^6$ is an alkyl group, it is preferable that the number of carbons in the alkyl group is 1 to 3. In the formula (1), when any of $R^1$ to $R^6$ is a fluorine-substituted alkyl group, it is preferable that in the fluorine-substituted alkyl group, at least one hydrogen atom is substituted with a fluorine atom and that the number of carbons in the alkyl group is 1 to 3. In the formula (1), when any of $R^1$ to $R^6$ is a chlorine-substituted alkyl group, it is preferable that in the chlorine-substituted alkyl group, at least one hydrogen atom is substituted with a chlorine atom and that the number of carbons in the alkyl group is 1 to 3. When the number of carbons in an unsubstituted alkyl group, a fluorine-substituted alkyl group alkyl group or a chlorine-substituted alkyl group is 1 to 3, viscosity of a solvent of an electrolytic solution does not become too high and the electrolytic solution has good ionic conduction. Examples of the fluorine-substituted alkyl group include $-CF_3$, $-C_2F_5$, $-C_3F_7$, $-CF_2CH_3$, $-CH_2CF_3$, and $-CH_2CHF_2$, and $-CF_3$ is more preferable. Examples of the chlorine-substituted alkyl group include $-CHCl_2$ and $CClF_2$. In the formula (1), at least one of $R^1$ to $R^6$ is selected from a fluorine atom or a fluorine-substituted alkyl group. The number of fluorine atoms contained in the compound represented by the formula (1) is not particularly limited, but 1 to 10 is preferable and 1 to 6 is more preferable. Moreover, although it is not particularly limited, it is preferable that either or both of $R^1$ and $R^2$ are a fluorine-substituted alkyl group.

As the fluorine-containing cyclic ether compound represented by the formula (1), for example, the following compounds are preferable.

Among these, 2,2-bistrifluoromethyl-1,3-dioxolane represented by the following formula (1-1) is more preferable.

(1-1)

These fluorine-containing cyclic ether compounds can be used singly or in combinations of two or more.

Content of the fluorine-containing cyclic ether compound represented by the formula (1) is not particularly limited, but 1 to 50 vol % is preferable in a solvent (including the fluorine-containing cyclic ether compound represented by the formula (1)) that constitutes an electrolytic solution, 2 vol % or more is more preferable and 5 vol % or more is further preferable, and 40 volume % or less is more preferable, and 30 vol % or less is further preferable. When the content of the fluorine-containing cyclic ether compound represented by the formula (1) is 1 vol % or more, since voltage endurance can be enhanced, the effect of suppressing gas generation is improved. When the content of the fluorine-containing cyclic ether compound represented by the formula (1) is 50 vol % or less, ion conductivity of the electrolytic solution can be improved, and therefore a charge-discharge rate of the battery becomes more excellent.

In the present embodiment, for a fluorine-containing chain ether compound, a compound represented by the following formula (2) is preferable.

$$R^{21}-O-R^{22} \quad (2)$$

wherein $R^{21}$ and $R^{22}$ are each independently an unsubstituted alkyl group or a fluorine-substituted alkyl group, and at least one of $R^{21}$ and $R^{22}$ is a fluorine-substituted alkyl group.

The fluorine-containing chain ether compound represented by the formula (2) is a compound in which a part of or all of hydrogens in the chain ether compound are substituted with fluorine. By using a fluorine-containing chain ether compound, oxidation resistance of an electrolytic solution is improved, and it is especially suitable for use in a battery comprising a positive electrode that operates at a high potential. As for a fluorine-containing chain ether compound, oxidation resistance increases with the increasing number of fluorine substitutions. However, when there are too many fluorine substitutions, reduction decomposition easily occurs and thus there is a case where an electrolytic solution decomposes on the negative electrode side or where compatibility with another solvent for the electrolytic solution is lost. Therefore, the ratio of the number of fluorine atoms to the total number of hydrogen atoms and fluorine atoms in a fluorine-containing chain ether compound is preferably 30% or more and 95% or less, and more preferably 40% or more and 90% or less, and further preferably 50% or more and 85% or less.

In the formula (2), although the total number of carbons of $R^{21}$ and $R^{22}$ is not particularly limited, but 4 or more and 10 or less is preferable, and 5 or more to 10 or less is more preferable. Although boiling and melting points of the fluorine-containing chain ether compound change depending on the number of carbon atoms thereof, it is preferable that the total number of carbon atoms of $R^{21}$ and $R^{22}$ is 4 or more since it exists as a liquid in the temperature range for practical operation of a secondary battery. Moreover, it is preferable that the total number of carbon atoms of $R^{21}$ and $R^{22}$ is 10 or less since viscosity does not become too high and good conductivity of a lithium ion can be obtained. Further, in the formula (2), the alkyl group may be a straight chain or a branch chain, and a straight chain is preferable.

Examples of a fluorine-containing chain ether compound include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,1,2,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H,1H,2'H-perfluorodipropyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H,1H,2'H-perfluorodipropyl ether, heptafluoropropyl 1,2,2,2-tetrafluoroethyl ether, 1,1,2,2-tetrafluoroethyl-2,2,3,3-tetrafluoropropyl ether, 2,2,3,3,3-pentafluoropropyl-1,1,2,2-tetrafluoroethyl ether, ethyl nonafluorobutyl ether, methyl nonafluorobutyl ether. These can be appropriately selected from the viewpoints of voltage endurance, a boiling point, and the like and may be used singly or in combinations of two or more. A chain ether compound is effective in reducing viscosity of an electrolytic solution as with a chain carbonate compound and a carboxylate ester compound which are mentioned later. Therefore, for example, a chain ether compound can be used instead of a chain carbonate compound and a carboxylate ester compound, and can be also used together with a chain carbonate compound and a carboxylate ester compound.

It is preferable that a fluorine-containing phosphate ester compound used for the present invention is a compound represented by the following formula (3).

(3)

wherein $R^{31}$, $R^{32}$, and $R^{33}$ each independently represent an alkyl group having 1 to 5 carbon atoms or a fluorine-substituted alkyl group having 1 to 5 carbon atoms, and at least one of these is a fluorine-substituted alkyl group.

When an electrolytic solution contains a fluorine-containing phosphate ester compound, oxidation resistance of the electrolytic solution can be enhanced and compatibility with another solvent component and ion conductivity of the electrolytic solution can be improved. Especially, it is suitable to use a fluorine-containing phosphate ester compound as a solvent of the electrolytic solution in a battery including a positive electrode which operates at a high potential since decomposition of the electrolytic solution at a high potential is suppressed. Oxidation resistance increases with the increasing number of fluorine substitutions in a fluorine-containing phosphate ester compound. However, when there are too many fluorine substitutions, reduction decomposition tend to occur easily, and thereby the electrolytic solution may decompose on the negative electrode side or the fluorine-containing phosphate ester compound may be difficult to be compatible with another solvent for the electrolytic solution. Therefore, the ratio of the number of fluorine atoms to the total number of hydrogen atoms and fluorine atoms in a fluorine-containing phosphate ester compound is preferably 30% or more and 100% or less, and more preferably 35% or more and 95% or less, and further preferably 40% or more and 90% or less. Among the compounds represented by the formula (3), the fluorine-containing phosphate ester compound represented by the following formula (3-1) is particularly preferable.

$$O=P(OCH_2Ra)_3 \quad (3\text{-}1)$$

wherein Ra each independently represent a fluorine-substituted alkyl group having 1 to 4 carbon atoms.

In the formula (3-1), it is preferable that the three Ra are the same fluorine-substituted alkyl group, and it is more preferable that the number of carbon atoms of Ra is 1 to 3. Furthermore, it is preferable that each carbon atom of Ra is bonded to at least one fluorine atom.

Examples of the fluorine-containing phosphate ester compound used in the present invention include 2,2,2-trifluoroethyl dimethyl phosphate, bis(trifluoroethyl) methyl phosphate, bis(trifluoroethyl) ethyl phosphate, tris(trifluoromethyl)phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl)phosphate, tris(2,2,3,3,3-pentafluoropropyl)phosphate, tris(2,2,2-trifluoroethyl)phosphate, tris(1H,1H-heptafluorobutyl)phosphate, and tris(1H,1H,5H-octafluoropentyl)phosphate. Among these, tris(2,2,2-trifluoroethyl)phosphate and tris(1H,1H-heptafluorobutyl)phosphate are particularly preferable.

These fluorine-containing phosphate ester compounds can be used singly or in combinations of two or more.

In the present embodiment, either or both of the above fluorine-containing chain ether compound and the above fluorine-containing phosphate ester compound (which may be hereafter described as "a fluorine-containing chain ether compound and/or a fluorine-containing phosphate ester compound") are contained as a solvent of an electrolytic solution. Although the content of a fluorine-containing chain ether compound and/or a fluorine-containing phosphate ester compound may be determined suitably, the range of 0.1 to 95 vol % in the solvent which constitutes the electrolytic solution is preferable, 0.2 vol % or more is more preferable, 0.5 vol % or more is more preferable, 5 vol % or more is more preferable, 10 vol % or more is more preferable, and 20 vol % or more is further preferable, and 90 vol % or less is more preferable, and 80 vol % or less is further preferable. When 0.1 vol % or more of a fluorine-containing chain ether compound is contained, low temperature characteristic can be more improved and an electric conduction rate can also be more improved. Moreover, when 95 vol % or less of a fluorine-containing chain ether compound is contained in a solvent, compatibility with another solvent component can be improved and the battery characteristic can be obtained stably.

In the present embodiment, the electrolytic solution may further contain other solvent components. The other solvent components include, for example, a cyclic carbonate compound (including a fluorine-containing compound), a chain carbonate compound (including a fluorine-containing compound), a chain carboxylate ester compound (including a fluorine-containing compound), a cyclic carboxylate ester compound (including a fluorine-containing compound), a phosphate ester compound which does not contain fluorine, cyclic ether compounds other than the fluorine-containing cyclic ether compound represented by the above-mentioned formula (1), a chain ether compound which does not contain fluorine, and γ-lactone such as γ-butyrolactone. In addition, the following aprotic organic solvents are exemplified such as dimethyl sulfoxide, formamide, acetamide, dimethylformamide, dioxolane, acetonitrile, propylnitrile, nitromethane, ethyl monoglyme, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone. Among these, cyclic carbonate compounds, chain carbonate compounds, fluorinated ether compounds, fluorinated carboxylate ester compounds and fluorinated carbonate compounds are suitable for combined use with the fluorine-containing cyclic ether compound represented by the above-mentioned formula (1) since they have high voltage endurance and a high electric conduction rate.

In the present embodiment, the electrolytic solution preferably contains a cyclic carbonate compound. Since the cyclic carbonate compound has a large specific dielectric constant, when contained in the electrolytic solution, it can raise a degree of disassociation of supporting salt and can improve ion conductivity of the electrolytic solution. The cyclic carbonate compound is not particularly limited, but examples thereof include ethylene carbonate (EC), propylene carbonate (PC), butylene carbonate (BC), and vinylene carbonate (VC). Moreover, a fluorine-containing cyclic carbonate compound can also be used as the cyclic carbonate compound. Examples of the fluorine-containing cyclic carbonate compound include compounds in which a part of or all of hydrogen atoms in ethylene carbonate (EC), propylene carbonate (PC), butylene carbonate (BC), vinylene carbonate (VC) and the like are substituted with fluorine atoms. Specifically, examples thereof include 4-fluoro-1,3-dioxolane-2-on, (cis or trans) 4,5-difluoro-1,3-dioxolane-2-on, 4,4-difluoro-1,3-dioxolane-2-on and 4-fluoro-5-methyl-1,3-dioxolane-2-on. Among these, from a viewpoint of voltage endurance and an electric conduction rate, ethylene carbonate, propylene carbonate, a partially fluorinated compound thereof and the like are preferable, and ethylene carbonate is more preferable. The cyclic carbonate may be used singly or in combinations of two or more.

The content of cyclic carbonate compound is not particularly limited, but 3 vol % or more is preferable in a solvent that constitutes an electrolytic solution, 5 vol % or more is more preferable and 10 vol % or more is further preferable, and 70 vol % or less is preferable, 50 vol % or less is more preferable, and 40 vol % or less is further preferable.

In the present embodiment, for the electrolytic solution, from the viewpoints of a dielectric constant, viscosity, compatibility, gas generation suppressing effect and the like, it is preferable to use a solvent containing: a cyclic carbonate compound; at least one selected from a fluorine-containing phosphate ester compound or a fluorine-containing chain ether compound; and the fluorine-containing cyclic ether compound represented by the formula (1). If necessary, another solvent component may be added. In this case, but is not particularly limited to, it is preferable that, for example, in the solvent constituting the electrolytic solution, the content of the cyclic carbonate compound is 3 to 70 vol % the content of at least one selected from the fluorine-containing phosphate ester compound or the fluorine-containing chain ether compound is 5 to 95 vol %, and the content of the fluorine-containing cyclic ether compound represented by the formula (1) is 1 to 40 vol %. Moreover, it is more preferable that the content of the cyclic carbonate compound is 5 to 50 vol % in the solvent constituting the electrolytic solution, the content of at least one selected from the fluorine-containing phosphate ester compound or the fluorine-containing chain ether compound is 10 to 90 vol %, and the content of the fluorine-containing cyclic ether compound represented by the formula (1) is 5 to 30 vol %. Furthermore, it is preferable that the content of the cyclic carbonate compound in the solvent constituting the electrolytic solution is 10 to 40 vol %, the content of at least one selected from the fluorine-containing phosphate ester compound or the fluorine-containing chain ether compound is 20 to 80 vol %, and the content of the fluorine-containing cyclic ether compound represented by the formula (1) is 5 to 20 vol %.

The chain carbonate compound used as a solvent component of the electrolytic solution is not particularly limited, but examples thereof include dimethyl carbonate (DMC), ethyl methyl carbonate (EMC), diethyl carbonate (DEC), dipropyl carbonate (DPC) and the like. Moreover, a fluorine-containing chain carbonate compound can be used as the chain carbonate compound. Examples of the fluorine-containing chain carbonate compound include compounds in which a part of or all of hydrogen atoms of ethyl methyl carbonate (EMC), dimethyl carbonate (DMC), diethyl carbonate (DEC), dipropyl carbonate (DPC) and the like are substituted with fluorine atoms. Specifically, examples thereof include bis(fluoroethyl) carbonate, 3-fluoropropylmethyl carbonate, 3,3,3-trifluoropropylmethyl carbonate, and 2,2,2-trifluoroethylmethyl carbonate. Among these, dimethyl carbonate is preferable from the viewpoint of voltage endurance and an electric conduction rate. The chain carbonate compound can be used singly or in combinations of two or more.

The content of the chain carbonate compound in the solvent constituting an electrolytic solution is not particularly limited, but 1 to 90 vol % is a preferable range from a viewpoint of lowering viscosity of the electrolytic solution; 3 vol % or more is more preferable from the viewpoint of obtaining sufficient additive effect; and from the point of obtaining sufficient combination effect with other solvents, 70 vol % or less is more preferable, and 50 vol % or less is more preferable, and 30 vol % or less is further preferable.

The carboxylate ester compound used as a solvent component of an electrolytic solution is not particularly limited but examples thereof include ethyl acetate, methyl propionate, ethyl formate, ethyl propionate, methyl butyrate, ethyl butyrate, methyl acetate, and methyl formate. Moreover, a fluorine-containing carboxylate ester compound may be used as the carboxylate ester compound. Examples of a fluorine-containing carboxylate ester compound include a compound in which a part of or all of hydrogen atoms of ethyl acetate, methyl propionate, ethyl formate, ethyl propionate, methyl butyrate, ethyl butyrate, methyl acetate or methyl formate are substituted with fluorine atoms. Specifically, examples thereof include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate and ethyl trifluoroacetate. Among these, from the viewpoints of voltage endurance, a boiling point and the like, ethyl propionate, methyl acetate, methyl 2,2,3,3-tetrafluoropropionate, 2,2,3,3-tetrafluoropropyl trifluoroacetate and the like are preferable.

The content of the carboxylate ester compound in a solvent which constitutes an electrolytic solution is not particularly limited, but it may be suitably determined in the range of 0.1 to 50 vol %; from the viewpoint of obtaining sufficient additive effect, 0.2 vol % or more is more preferable and 0.5 vol % or more is further preferable; and from the viewpoint of obtaining sufficient combination effect with other solvents, 20 vol % or less is more preferable and 15 vol % or less is further preferable. By containing a carboxylate ester compound, low temperature characteristic can be more improved and further an electric conduction rate can be more improved. Moreover, when the content of the carboxylate ester compound is reduced to 50 vol % or less, it is possible to reduce a rise of vapor pressure in the case of leaving the battery at a high temperature. The carboxylate ester compound is effective in decreasing viscosity of the electrolytic solution as with a chain carbonate compound. Therefore, the carboxylate ester compound may be used instead of a chain carbonate compound or may be also used together with a chain carbonate compound.

An electrolytic solution may also contain, for example, 1,2-diethoxy ethane (DEE), ethoxy methoxy ethane (EME) or the like as a chain ether compound which does not contain fluorine. The content of the chain ether compound which does not contain fluorine is not particularly limited, but it is preferably as much as the content of the above-mentioned fluorine-containing chain ether compound.

An electrolytic solution may also contain, for example, trimethyl phosphate, triethyl phosphate, tributyl phosphate and the like as a phosphate ester compound which does not contain fluorine. The content of the phosphate ester compound which does not contain fluorine is not particularly limited, but it is preferably as much as the content of the above-mentioned fluorine-containing phosphate ester compound.

An electrolytic solution may also contain, as a solvent, a cyclic ether compound other than the fluorine-containing cyclic ether compound represented by the above-mentioned formula (1). For example, examples thereof include cyclic ether compounds such as tetrahydrofuran, 2-methyl tetrahydrofuran, 3-methyl tetrahydrofuran, tetrahydropyran, 2-methyl tetrahydropyran, 3-methyl tetrahydropyran, 4-methyl tetrahydropyran, 1,4-dioxane, 2-methyl-1,4-dioxane, 2-ethyl-1,4-dioxane, 2-propyl-1,4-dioxane, 2,3-dimethyl-1,4-dioxane, 1,3-dioxane, 2-methyl-1,3-dioxane, 4-methyl-1,3-dioxane, 5-methyl-1,3-dioxane, 2,4-dimethyl-1,3-dioxane or 4-ethyl-1,3-dioxane; or compounds in which at least one hydrogen atom of these cyclic ether compounds is substituted with a fluorine atom. Moreover, the electrolytic solution may also contain 1,3-dioxolane, 2-methyl-1,3-dioxolane, 4-methyl-1,3-dioxolane and the like.

Examples of a supporting salt contained in the electrolytic solution include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$ and $LiB_{10}Cl_{10}$. Another supporting salt includes lower aliphatic carboxylic acid lithium carboxylate, chloroboran lithium, lithium tetraphenylborate, LiBr, LiI, LiSCN and LiCl. The supporting salt can be used singly or in combinations of two or more.

An ion conductive polymer may be added to an electrolytic solution. Examples of the ion conductive polymer include polyether such as polyethylene oxide and polypropylene oxide, and polyolefin such as polyethylene and polypropylene. Further examples include polyvinylidene fluoride, polytetrafluoroethylene, polyvinyl fluoride, polyvinyl chloride, polyvinylidene chloride, polymethylmethacrylate, polymethylacrylate, polyvinyl alcohol, polymethacrylonitrile, polyvinylacetate, polyvinylpyrrolidinone, polycarbonate, polyethylene terephthalate, polyhexamethylene adipamide, polycaprolactam, polyurethane, polyethylene imine, polybutadiene, polystyrene, polyisoprene, and derivatives thereof. The ion conductive polymer may be used singly or in combinations of two or more. Moreover, a polymer containing various monomers that constitute the above-mentioned polymer may be also used.

(Positive Electrode)

It is preferable that the lithium secondary battery according to the present embodiment comprises a positive electrode with 4.5 V or more versus lithium metal from a viewpoint of obtaining high energy density. A positive electrode active material used for such a positive electrode includes a spinel-based material, an olivine-based material, a layer-based material and the like.

As for a spinel-based material, the material represented by the following formula (4) is preferable:

$$Li_a(M_xMn_{2-y}Y_y)(O_{4-w}Z_w) \quad (4)$$

wherein $0 \leq x \leq 1.2$, preferably $0.4 < x < 1.1$, $0 \leq y$, preferably $0 \leq y < 0.5$, and $x+y<2$, $0 \leq a \leq 1.2$, $0 \leq w \leq 1$; M includes at least one selected from Co, Ni, Fe, Cr or Cu; Y includes at least one selected from Li, B, Na, Al, Mg, Ti, Si, K or Ca; and Z includes at least one of F or Cl.

Moreover, $LiMn_2O_4$ and the compound represented by the following formula (4-1), in which a part of Mn is substituted and which has long life and can operate around 4 V versus lithium, may also be used as a positive electrode material.

$$LiMn_{2-x}M_xO_4 \quad (4-1)$$

wherein $0<x<0.3$, and M includes at least one selected from Li, Al, B, Mg, Si and a transition metal.

Among these spinel-based materials, as a material which operates at a high potential of 4.5 V or more versus lithium, for example, $LiNi_{0.5}Mn_{1.5}O_4$, $LiCoMnO_4$, $LiCrMnO_4$, $LiFeMnO_4$, $LiCu_{0.5}Mn_{1.5}O_4$ and the like are preferable. Moreover, there may be used a solid solution of these materials or a positive electrode active material in which Al, Mg, B, Si, Ti and other metallic elements are added in small amounts to these materials.

An olivine-based material is represented by the following formula (5):

$$LiMPO_4 \quad (5)$$

wherein M is a transition metal, preferably any one or more selected from Fe, Mn, Co or Ni, and more preferably either Co or Ni.

Examples of the olivine-based material include $LiFePO_4$, $LiMnPO_4$, $LiCoPO_4$, $LiNiPO_4$ and the like. Moreover, in these materials, there may be used a material in which a part of transition metals is substituted with another element or in which an oxygen portion is substituted with fluorine. From the viewpoint of high energy density, it is preferable that M includes at least one of Co and Ni in the above-mentioned formula (5) since operation is performed at a high potential of 4.5 V or more versus lithium.

A layer-based material is represented by the general formula: $LiMO_2$ (M represents a transition element). Specifically, examples thereof include $LiCoO_2$, $LiNi_{1-x}M_xO_2$ (M is an element including at least Co or Al, $0.05<x<0.3$), $Li(Ni_xCo_yMn_{1-x-y})O_2$ ($0.1<x<0.7$, $0<y<0.5$), and a compound represented by the following formula (6):

$$Li(Li_xM_{1-x-z}Mn_z)O_2 \quad (6)$$

wherein $0 \leq x < 0.3$, $0.3 \leq z \leq 0.7$, and M is at least one selected from Co, Ni or Fe.

Among these, the compound represented by the above-mentioned formula (6) is particularly preferable since high capacity is available by charging at a high potential of 4.5 V or more versus lithium.

In addition, a NASICON type, a lithium transition metal silicon composite oxide and the like may be used as a positive electrode active material.

The specific surface area of these positive electrode active materials is, for example, 0.01 to 5 $m^2/g$, preferably 0.05 to 4 $m^2/g$, more preferably 0.1 to 3 $m^2/g$, and further preferably 0.2 to 2 $m^2/g$. When the specific surface area is set within such a range, a contact area with an electrolytic solution can be adjusted to a suitable range. That is, when the specific surface area is set to 0.01 $m^2/g$ or more, it becomes easy to perform intercalation and deintercalation of a lithium ion smoothly and therefore resistance can be more reduced. Moreover, when the specific surface area is set to 5 $m^2/g$ or less, it is more possible to suppress progress of decomposition of an electrolytic solution and elution of a component element of the active material. The specific surface area can be measured with the usual BET specific surface area measuring method.

A median particle size of the above-mentioned positive electrode active material is preferably 0.01 to 50 μm and more preferably 0.02 to 40 μm. When the particle size is 0.01 μm or more, it is more possible to suppress elution of a component element of the positive electrode active material and degradation by contact with an electrolytic solution. Moreover, when the particle size is 50 μm or less, it becomes easy to perform intercalation and deintercalation of a lithium ion smoothly and therefore resistance can be more reduced. The median particle size is 50% cumulative volume diameter $D_{50}$ (median diameter), and can be measured with a laser diffraction dispersion type particle size distribution measuring apparatus.

Examples of a binder for positive electrode include polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide. Among these, from the viewpoint of versatility and low cost, polyvinylidene fluoride is preferable. From the viewpoint of a trade-off relationship between "sufficient binding force" and "energy density", the amount of the binder used for positive electrode is preferably 2 to 10 parts by mass based on 100 parts by mass of the positive electrode active material.

From a viewpoint of electrochemical stability, examples of a positive electrode current collector include aluminum, nickel, silver, stainless steel (SUS), a valve metal, and alloys thereof. Their shape includes foil, plate-like and mesh-like. In particular, aluminum foil can be used suitably.

A conductive assistant may be added to a positive electrode material containing a positive electrode active material in order to reduce impedance. The conductive assistant includes a carbonaceous microparticle such as graphite, carbon black, and acetylene black.

The positive electrode may be produced, for example, by preparing slurry containing a positive electrode active material, a binder and a solvent (if further necessary, a conductive assistant) and then applying this slurry on a positive electrode current collector and drying to form a positive electrode active material layer on the positive electrode current collector.

(Negative Electrode)

The negative electrode is not particularly limited as long as a material that can intercalate and deintercalate lithium is contained therein as a negative electrode active material.

Examples of the negative electrode active material include a carbon material (a) that can intercalate and deintercalate a lithium ion, a metal (b) that can be alloyed with lithium, and a metal oxide (c) that can intercalate and deintercalate a lithium ion.

As a carbon material (a), graphite, amorphous carbon, diamond-like carbon, a carbon nanotube, or a composite thereof can be used.

Highly crystalline graphite has high electrical conductivity and excels in voltage flatness and adhesiveness with a positive electrode current collector composed of a metal such as copper. On the other hand, low crystalline amorphous carbon has comparatively small volume expansion and therefore has large effect to relax volume expansion of the whole negative electrode, and degradation derived from ununiformity such as a grain boundary or a defect is difficult to occur therein.

The carbon material (a) may be used alone or together with another active material, but when used together with another active material, its content in the negative electrode active material may be arbitrarily determined in the range of 2 mass % or more and 80 mass % or less, and preferably the range of 2 mass % or more and 30 mass % or less.

As the metal (b), Al, Si, Pb, Sn, Zn, Cd, Sb, In, Bi, Ag, Ba, Ca, Hg, Pd, Pt, Te, La; or an alloy containing two or more thereof; or an alloy of lithium with these metals or alloys and the like may be used. In particular, silicon (Si) or a silicon-containing metal is preferable as the metal (b). The metal (b) can be used alone or together with another active material, but when used together with another active material, its content in the negative electrode active material may be arbitrarily determined in the range of 5 mass % or more and 90 mass % or less, and preferably the range of 20 mass % or more and 50 mass % or less.

As the metal oxide (c), silicon oxide, aluminum oxide, tin oxide, indium oxide, zinc oxide, lithium oxide, or a composite containing two or more of these may be used. In particular, it is preferable to contain silicon oxide as the metal oxide (c). This is because silicon oxide is comparatively stable and is hard to trigger a reaction with other compounds. Moreover, one or two or more elements selected from nitrogen, boron and sulfur may also be added to the metal oxide (c) in amounts of, for example, 0.1 to 5 mass %. Thereby, electrical conductivity of the metal oxide (c) can be raised. The metal oxide (c) can be used alone or together with another active material, but when used together with another active material, its content in the negative electrode active material may be arbitrarily determined in the range of 5 mass % or more and 90 mass % or less, and preferably the range of 40 mass % or more and 70 mass % or less.

Specific examples of a metal oxide (c) include $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($1 \leq x \leq 4/3$), $PbO_2$ and $Pb_2O_5$.

Examples of another negative electrode active material include a metal sulfide (d) that can intercalate and deintercalate a lithium ion. Examples of the metal sulfide (d) include $SnS$ and $FeS_2$. In addition, examples of the negative electrode active material include metallic lithium or a lithium alloy, polyacene or polythiophene, or lithium nitride such as $Li_5$ ($Li_3N$), $Li_7MnN_4$, $Li_3FeN_2$, $Li_{2.5}Co_{0.5}N$ or $Li_3CoN$.

The above negative electrode active material can be used singly or in combinations of two or more.

When two or more negative electrode active materials are mixed and used, they may have composition containing a carbon material (a), metal (b), and a metal oxide (c). Hereafter, this negative electrode active material will be explained.

It is preferable that the whole or a part of the metal oxide (c) has amorphous structure. The metal oxide (c) having amorphous structure can suppress volume expansion of the carbon material (a) and the metal (b), and can further suppress decomposition of the electrolytic solution. this mechanism is assumed that the metal oxide (c) having amorphous structure exerts a certain influence on film formation at the interface between the carbon material (a) and the electrolytic solution. In addition, it is considered that in amorphous structure, factors derived from ununiformity such as a grain boundary or a defect are comparatively small. It can be confirmed that the whole or a part of the metal oxide (c) has amorphous structure by X-ray diffraction measurement (general XRD measurement). Specifically, when the metal oxide (c) does not have amorphous structure, an inherent peak is observed in the metal oxide (c), but when the whole or a part of of the metal oxide (c) has amorphous structure, an inherent peak of the metal oxide (c) is observed as a broad peak.

It is preferable that the metal oxide (c) is an oxide of a metal which constitutes the metal (b). For example, it is preferable that the metal (b) and metal oxide (c) are silicon (Si) and silicon oxide (SiO), respectively.

It is preferable that the whole or a part of the metal (b) is distributed in the metal oxide (c). When at least a part of the metal (b) is distributed in the metal oxide (c), volume expansion of the whole negative electrode can be more suppressed, and decomposition of an electrolytic solution can also be controlled. The distribution of the whole or a part of the metal (b) in the metal oxide (c) can be observed by using a combination of transmission electron microscope observation (general TEM observation) and energy dispersion type X-ray spectroscopy measurement (general EDX measurement). Specifically, a section of a sample containing metal (b) particles is observed, and oxygen concentration of the particles distributed in the metal oxide (c) is measured, and thereby it can be confirmed that the metal constituting the particles does not become an oxide.

It is preferable to set each content of the carbon material (a), metal (b) and metal oxide (c) with respect to the total of the carbon material (a), metal (b) and metal oxide (c) as follows. The content of the carbon material (a) is preferably 2 mass % or more and 80 mass % or less, and more preferably 2 mass % or more and 30 mass % or less. The content of the metal (b) is preferably 5 mass % or more and 90 mass % or less, and more preferably 20 mass % or more and 50 mass % or less. The content of the metal oxide (c) is preferably 5 mass % or more and 90 mass % or less, and more preferably 40 mass % or more and 70 mass % or less.

The negative electrode active material in which the whole or a part of the metal oxide (c) has amorphous structure and the metal (b) is wholly or partially distributed in the metal oxide (c) can be produced by, for example, the method disclosed in the Japanese Patent Laid-Open No. 2004-47404. For example, the metal oxide (c) is disproportionated at 900 to 1400° C. under the atmosphere containing organic compound gas such as methane gas, and heat CVD processing is performed simultaneously. Thereby, it is possible to obtain a composite in which a metallic element in the metal oxide (c) becomes a nanocluster as the metal (b) and the surface is covered with the carbon material (a).

Moreover, the above-mentioned negative electrode active material can be also produced by mixing the carbon material (a), metal (b) and metal oxide (c) with a mechanical milling.

The carbon material (a), metal (b) and metal oxide (c) are not particularly limited, but a particle-shaped one may be used, respectively. When the negative electrode active material is composed of an aggregate of particles, binding force between different material particles can be kept moderate, and therefore it is possible to suppress generation of remaining stress and remaining distortion resulting from a difference of volume change accompanied with charge and discharge. For example, it is preferable that an average particle size of the metal (b) is smaller than that of the carbon material (a) and that of the metal oxide (c). In this case, the metal (b) having large volume change associated at the time of charge and discharge has a relatively small particle size, and the carbon material (a) and metal oxide (c) having small volume change have a relatively large particle size, and therefore dendrite generation and micropowderization of alloy is suppressed more effectively. Moreover, in process of charge and discharge, intercalation and deintercalation of lithium are performed alternately in order of particles with large diameter, particles with small diameter, and particles with large diameter. Thereby, the generation of remaining stress and remaining distortion is suppressed. An average particle size of the metal (b) may be, for example, 20 µm or less, and preferably 15 µm or less. Herein, the average particle size is 50% cumulative volume diameter $D_{50}$ (median diameter) that can be obtained with diameter distribution measurement using the laser diffraction dispersion method.

Moreover, it is preferable that an average particle size of the metal oxide (c) is ½ or less of that of the carbon material (a), and it is preferable that an average particle size of the metal (b) is ½ or less of that of the metal oxide (c). Furthermore, it is more preferable that an average particle size of the metal oxide (c) is ½ or less of that of the carbon material (a) and further that the average particle size of the metal (b) is ½ or less of that of the metal oxide (c). When an average particle size is controlled in such a range, relaxation effect on volume expansion of the metal and alloy phase can be obtained more effectively, and thus it is possible to obtain a secondary battery having excellent energy density and excellent balance of cycle life and efficiency. More specifically, it is preferable that an average particle size of the silicon oxide (c) is set to ½ or less of that of graphite (a) and that an average particle size of silicon (b) is set to ½ or less of that a silicon oxide (c). The average particle size of silicon (b) can be, for example, 20 µm or less, and preferably 15 µm or less.

A binder for negative electrode is not particularly limited, but includes polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide.

The content of the binder for the negative electrode to the total amount of the negative electrode active material and the binder for negative electrode is preferably in the range of 1 to 30 mass %, and more preferably 2 to 25 mass %. When it is 1 mass % or more, adhesion between the active materials or between the active material and a current collector is improved and therefore cycle characteristic becomes excellent. Moreover, when it is 30 mass % or less, a ratio of the active material is increased to allow for an improvement in negative electrode capacity.

A negative electrode current collector is not particularly limited, but in view of electrochemical stability, aluminum, nickel, copper, silver, and an alloy containing two or more of these metals are preferable. Examples of its shape include foil, plate-like and mesh-like.

The negative electrode can be produced by forming a negative electrode active material layer on a negative electrode current collector, wherein the negative electrode active material layer contains a negative electrode active material, a binder for negative electrode and, if necessary, a conductive assistant. The negative electrode active material layer can be formed with a general slurry applying method. Specifically, slurry containing a negative electrode active material, a binder and a solvent is prepared, and this slurry is applied on a negative electrode current collector, and then this is dried, optionally pressed and shaped to obtain a negative electrode. The applying method of the negative electrode slurry includes a doctor blade method, a die coater method and a dip coating method. After forming the negative electrode active material layer in advance, a thin film of aluminum, nickel or an alloy thereof is formed as a current collector by a method such as vapor deposition and sputtering, and thereby a negative electrode can also be obtained.

(Separator)

Examples of a separator placed between the positive electrode and negative electrode include a porous polymer film, a woven or nonwoven fabric composed of polyolefin such as polyethylene and polypropylene, polyimide, fluororesin such as polyvinylidene fluoride or the like and an ion conductive polymer electrolyte film. These can be used alone or in combination.

(The Shape and Outer Package of the Battery)

Examples of the shape of the battery include a cylinder type, a square type, a coin type, a button type and a laminated type.

In case of a laminated type, the electrode and separator are laminated while keeping a plane shape, and there is not a portion where R is small (i.e. an area in the vicinity of the center of winding structure, or an area corresponding to a folded portion in flat winding structure). Therefore, when an active material having large volume change associated with charge and discharge is used, it is hard to receive bad influence by volume change of the electrode associated with charge and discharge compared with a battery having winding structure.

Examples of an outer package of the battery include stainless steel, iron, aluminum, titanium and an alloy thereof or a plating processed product thereof. Examples of the plating include nickel plating. When the shape of the battery is a laminated type, a laminate film is preferable as an outer package.

For example, a film in which a thermal adhesion layer and a metallic foil layer are laminated can be used as the laminate film. Examples of the metallic foil layer on a resin base material layer of the laminate film include aluminum, an aluminium alloy and titanium foil. Examples of a material of the thermal adhesion layer (resin base material layer) of the laminate film include a thermoplastic polymer material such as polyethylene, polypropylene and polyethylene terephthalate. Moreover, the resin base material layer or the metallic foil layer of the laminate film is not limited to one layer, respectively, and may be two or more layers. From the viewpoint of versatility or cost, an aluminum laminate film is preferable.

When the laminate film is used as an outer package, volume change of the battery and distortion of the electrode resulting from gas generation easily occur compared with the case where a metal can is used as an outer package. This is because it is easier to transform the laminate film due to internal pressure of the battery than a metal can. Furthermore, in sealing a secondary battery using the laminate film as an outer package, inner pressure of the battery is usually made lower than atmospheric pressure and there is no excessive space in the inside, and therefore, if gas is generated in the battery, it is easy to immediately lead to volume change of the battery and deformation of the electrode. Moreover, in the case of the laminated type battery, gas is easy to remain between the electrodes when gas is generated between the electrodes compared with a battery having winding structure, and thus there is a tendency that the interval between electrodes easily spreads. This tendency becomes more significant when an outer package of laminate film is used. However, according to the present embodiment, the occurrence of such a problem can be prevented, and even in the case of a laminated type battery using a laminate film outer package, a secondary battery having excellent reliability over a long period of time can be provided.

(Basic Structure of the Battery)

Figure 1:
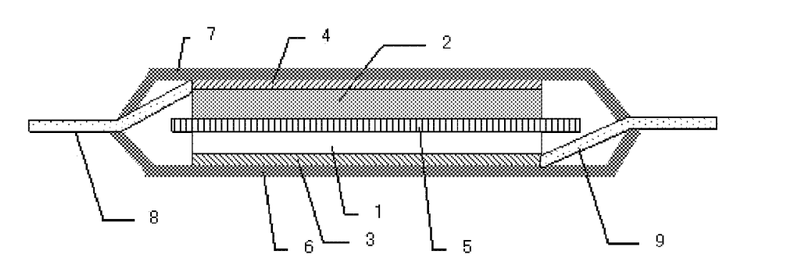
FIG. 1 is a diagram showing an example of a cross-sectional structure of a secondary battery according to the embodiment of the present invention.

An example of sectional view of the laminated type lithium secondary battery according to the present embodiment is shown in FIG. 1. As shown in FIG. 1, the lithium secondary battery according to the present embodiment has: a positive electrode comprising a positive electrode current collector 3 composed of a metal such as aluminum foil and a positive electrode active material layer 1 containing a positive electrode active material formed thereon; and a negative electrode comprising a negative electrode current collector 4 composed of a metal such as copper foil and a negative electrode active material layer 2 containing a negative electrode active material formed thereon. The positive electrode and negative electrode are laminated via a separator 5 composed of a nonwoven fabric, a polypropylene microporous film and the like so that the positive electrode active material layer 1 and the negative electrode active material layer 2 are faced on each other. This electrode pair is accommodated in a case formed of exterior bodies 6 and 7 such as an aluminum laminate film. A positive electrode tab 9 is connected to the positive electrode current collector 3, and a negative electrode tab 8 is connected to the negative electrode current collector 4. These tabs are pulled out of the case. An electrolytic solution is injected into the case, and the case is sealed. It is also possible to form structure where an electrode group in which two or more of the electrode pairs are laminated is accommodated in the case.

EXAMPLES

Hereafter, Examples are given to specifically explain the present invention, but the scope of the present invention is not limited to these Examples, and the present invention can be embodied with proper modification within the scope of the present invention.

In the following Examples and Comparative Examples, a secondary battery which has the structure shown in FIG. 1 was produced and evaluated.

Abbreviations of the compounds used in the following examples are explained.

F-DOL1: 2,2-bistrifluoromethyl-1,3-dioxolane
F-DOL2: 2-trifluoromethyl-1,3-dioxolane
FE1: 1,1,2,2-tetrafluoroethyl-2,2,3,3-tetrafluorpropyl ether
FE2: 1H,1H,2'H,3H-decafluorodipropyl ether
FE3: 1H,1H,2'H-perfluorodipropyl ether
FP1: tris(2,2,2-trifluoroethyl)phosphate
FP2: tris(1H,1H-heptafluorobutyl)phosphate
EC: ethylene carbonate
DMC: dimethyl carbonate
PC: propylene carbonate
DOL: 1,3-dioxolane Example 1

$LiNi_{0.5}Mn_{1.5}O_4$ (90 parts by mass) as a positive electrode active material, polyvinylidene fluoride (5 parts by mass) as an adhesive agent, and carbon black (5 parts by mass) as an electric conductive assistant were mixed to prepare a positive electrode mixture. This positive electrode mixture is dispersed in N-methyl-2-pyrrolidone to prepare slurry for positive electrode. This slurry for positive electrode was uniformly applied to one side of a 20 μm thick current collector made of aluminum. The thickness of the applied film was adjusted so that the initial charge capacity per unit area might be set to 2.5 mAh/cm$^2$. After drying, compression molding was carried out by a roll press to obtain a positive electrode.

For a negative electrode active material, natural graphite in which low crystalline carbon was processed on the surface was used. This graphite was dispersed in a solution in which PVDF was dissolved into N-methylpyrrolidone to prepare slurry for negative electrode. The mass ratio of the negative electrode active material and a binder was set to 90/10 (active material/binder). This slurry for negative electrode was uniformly applied on a 10 μm thick Cu current collector. The thickness of the applied film was adjusted so that the initial charge capacity per unit area might be set to 3.0 mAh/cm$^2$. After drying, compression molding was carried out by a roll press to obtain a negative electrode.

The positive electrode and negative electrode which were cut to 3 cm×3 cm were laminated via a separator so as to be faced with each other. A 25 μm thick microporous polypropylene film was used as the separator.

As a solvent of an electrolytic solution, the mixed solvent in which ethylene carbonate (hereinafter referred to as "EC"), tris(2,2,2-trifluoroethyl)phosphate (hereinafter referred to as "FP1") and 2,2-bistrifluoromethyl-1,3-dioxolane (hereinafter referred to as "F-DOL1") as a fluorine-containing cyclic ether compound were mixed in a volume ratio of 40/40/20 (EC/FP1/F-DOL1). $LiPF_6$ was dissolved in this mixed solvent in a concentration of 1 mol/L to obtain a nonaqueous electrolytic solution.

The outside of the electrode pair via the above-mentioned separator was covered with an aluminum laminate film, and the nonaqueous electrolytic solution was injected and sealing was performed to provide a lithium secondary battery. As shown in FIG. 1, tabs were connected to the positive electrode and negative electrode, and the tabs were electrically connected to the outside of the outer packaging case composed of an aluminum laminate film.

(Volume Increase Ratio)

After production of the lithium secondary battery, volume (initial volume) was measured before charge and discharge. The volume measurement was performed using the Archimedes method. This lithium secondary battery was charged at 20 mA. After maximum voltage reached to 4.8 V, the battery was charged at a constant voltage until the total charge time became 2.5 hours. Then, the battery was discharged at a constant current of 20 mA until the voltage became the minimum voltage 3 V. This charge and discharge were repeated 50 times. This charge and discharge were carried out in a constant temperature bath of 45° C. Once the 50 cycles of charge and discharge were finished, the volume of the lithium secondary battery was measured by the same method as the measurement before charge and discharge.

The volume increase ratio was calculated according to the following formula.

Volume increase ratio(%)=100×(volume after charge and discharge−initial volume)/initial volume (Capacity Maintenance Ratio)

Moreover, a capacity maintenance ratio was calculated according to the following formula: Capacity maintenance ratio (%)=100×(discharge capacity at the 50th cycle)/(discharge capacity of the 1st cycle).

The calculation results of the volume increase rate and capacity maintenance ratio are shown in Table 1.

Example 2

A lithium secondary battery was produced in the same manner as Example 1 except that 2-trifluoromethyl-1,3-dioxolane (hereinafter referred to as "F-DOL2") was used as a fluorine-containing cyclic ether compound in place of F-DOL1. Then, measurement of its volume and capacity maintenance rate was performed. The result is shown in Table 1.

Comparative Example 1

A lithium secondary battery was produced in the same manner as Example 1 except that EC and dimethyl carbonate (DMC) were used in a volume ratio of 4/6 (EC/DMC) as the solvent of the electrolytic solution. Then, the similar measurement was performed. The result is shown in Table 1.

Comparative Example 2

A lithium secondary battery was produced in the same manner as Example 1 except that a mixed solvent with a volume ratio (EC/DMC/F-DOL1=4/3/3) was used in place of the mixed solvent used in Example 1. Then, the similar measurement was performed. The result is shown in Table 1.

Comparative Example 3

A lithium secondary battery was produced in the same manner as Example 1 except that a mixed solvent with a volume ratio (EC/F-DOL1=4/6) was used in place of the mixed solvent used in Example 1. Then, the similar measurement was performed. The result is shown in Table 1.

Comparative Example 4

A lithium secondary battery was produced in the same manner as Example 1 except that a mixed solvent with a volume ratio (EC/FP1=6/4) was used in place of the mixed solvent used in the Example 1. Then, the similar measurement was performed. The result is shown in Table 1.

Comparative Example 5

A lithium secondary battery was produced in the same manner as Example 1 except that a mixed solvent using 1,3-dioxolane (hereinafter referred to as "DOL") with a volume ratio (EC/FP1/DOL=4/4/2) was used in place of the mixed solvent used in Example 1. Then, the similar measurement was performed. The result is shown in Table 1.

Example 3

A lithium secondary battery was produced in the same manner as Example 1 except that a mixed solvent with a volume ratio (EC/FP1/F-DOL1=2/6/2) was used in place of the mixed solvent used in Example 1. Then, the similar measurement was performed. The result is shown in Table 1.

Example 4

A lithium secondary battery was produced in the same manner as Example 1 except that a mixed solvent with a volume ratio (EC/FP1/F-DOL1=1/7/2) was used in place of the mixed solvent used in Example 1. Then, the similar measurement was performed. The result is shown in Table 1.

Example 5

A lithium secondary battery was produced in the same manner as Example 1 except that a mixed solvent using tris(1H,1H-heptafluorobutyl)phosphate (hereinafter referred to as "FP2") as a fluorination phosphate ester with a volume ratio (EC/FP2/F-DOL1=1/7/2) was used in place of the mixed solvent used in Example 1. Then, the similar measurement was performed. The result is shown in Table 1.

Example 6

A lithium secondary battery was produced in the same manner as Example 1 except that a mixed solvent using 1,1,2,2-tetrafluoroethyl-2,2,3,3-tetrafluoropropyl ether (hereinafter referred to as "FE1") as a fluorinated ether with a volume ratio (EC/PC/FE1/F-DOL1=1/2/5/2) was used in place of the mixed solvent used in Example 1. Then, the similar measurement was performed. The result is shown in Table 1.

Example 7

A lithium secondary battery was produced in the same manner as Example 1 except that a mixed solvent using 1H,1H,2'H,3H-decafluorodipropyl ether (hereinafter referred to as "FE2") as a fluorinated ether with a volume ratio (EC/PC/FE2/F-DOL1=1/2/5/2) was used in place of the mixed solvent used in Example 1. Then, the similar measurement was performed. The result is shown in Table 1.

Example 8

A lithium secondary battery was produced in the same manner as Example 1 except that a mixed solvent with a volume ratio (EC/FE1/FP1/F-DOL1=2/3/3/2) was used in place of the mixed solvent used in Example 1. Then, the similar measurement was performed. The result is shown in Table 1.

Example 9

A lithium secondary battery was produced in the same manner as Example 1 except that a mixed solvent with a volume ratio (EC/FE2/FP1/F-DOL1=2/3/3/2) was used in place of the mixed solvent used in Example 1. Then, the similar measurement was performed. The result is shown in Table 1.

Example 10

A lithium secondary battery was produced in the same manner as Example 1 except that a mixed solvent using 1H,1H,2'H-perfluorodipropyl ether (hereinafter referred to as "FE3") as a fluorinated ether with a volume ratio (EC/FE3/FP1/F-DOL1=2/3/3/2) was used in place of the mixed solvent used in Example 1. Then, the similar measurement was performed. The result is shown in Table 1.

Then, there was performed an evaluation of the positive electrode active material having spinel structure which is a positive electrode material capable of intercalating and deintercalating lithium at a potential of 4.5 V or more versus lithium while elements and the like added to the active material were changed.

Example 11

A lithium secondary battery was produced in the same manner as Example 3 except that $LiNi_{0.5}Mn_{1.35}Ti_{0.15}O_4$ was used as a positive electrode active material. Then, the similar measurement was performed. The result is shown in Table 2.

Example 12

A lithium secondary battery was produced in the same manner as Example 3 except that $LiNi_{0.5}Mn_{1.47}Mg_{0.03}O_4$ was used as a positive electrode active material. Then, the similar measurement was performed. The result is shown in Table 2.

Example 13

A lithium secondary battery was produced in the same manner as Example 3 except that $LiNi_{0.5}Mn_{1.45}Al_{0.05}O_{3.95}F_{0.05}$ was used as a positive electrode active material. Then, the similar measurement was performed. The result is shown in Table 2.

TABLE 1

| | Electrolyte composition | Mixing ratio (volume ratio) | Charge-discharge range (V) | Volume increase ratio (%) | Capacity maintenance ratio (%) |
|---|---|---|---|---|---|
| Ex. 1 | EC/FP1/F-DOL1 | 4/4/2 | 4.8~3 | 7 | 73 |
| Ex. 2 | EC/FP1/F-DOL2 | 4/4/2 | 4.8~3 | 10 | 71 |
| Com-Ex. 1 | EC/DMC | 4/6 | 4.8~3 | 120 | 67 |
| Com-Ex. 2 | EC/DMC/F-DOL1 | 4/3/3 | 4.8~3 | 40 | 68 |
| Com-Ex. 3 | EC/F-DOL1 | 4/6 | 4.8~3 | 13 | 52 |
| Com-Ex. 4 | EC/FP1 | 6/4 | 4.8~3 | 14 | 69 |
| Com-Ex. 5 | EC/FP1/DOL | 4/4/2 | 4.8~3 | 210 | 43 |
| Ex. 3 | EC/FP1/F-DOL1 | 2/6/2 | 4.8~3 | 5 | 73 |
| Ex. 4 | EC/FP1/F-DOL1 | 1/7/2 | 4.8~3 | 3 | 72 |
| Ex. 5 | EC/FP2/F-DOL1 | 1/7/2 | 4.8~3 | 6 | 71 |
| Ex. 6 | EC/PC/FE1/F-DOL1 | 1/2/5/2 | 4.8~3 | 6 | 70 |
| Ex. 7 | EC/PC/FE2/F-DOL1 | 1/2/5/2 | 4.8~3 | 7 | 71 |
| Ex. 8 | EC/FE1/FP1/F-DOL1 | 2/3/3/2 | 4.8~3 | 5 | 73 |
| Ex. 9 | EC/FE2/FP1/F-DOL1 | 2/3/3/2 | 4.8~3 | 4 | 72 |
| Ex. 10 | EC/FE3/FP1/F-DOL1 | 2/3/3/2 | 4.8~3 | 4 | 71 |

Ex. = Example
Com-Ex. = Comparative Example

From the results of Table 1, it was confirmed that when there was used an electrolytic solution which contains at least one of fluorine-containing chain ether compounds or fluorine-containing phosphate ester compounds in addition to a fluorine-containing cyclic ether compound represented by the general formula (1), the amount of gas generated can be reduced and a volume increase ratio is suppressed, and a capacity maintenance ratio can be improved. Moreover, in the case of using a cyclic ether compound having the same structure as the formula (1) except that fluorine was not contained, the amount of gas generated was much and the capacity maintenance ratio was also low, and thus it was confirmed that a cyclic ether compound containing fluorine have high improvement effect of suppressing the amount of gas generated.

Example 14

A lithium secondary battery was produced in the same manner as Example 3 except that $LiNi_{0.4}Fe_{0.2}Mn_{1.4}O_4$ was used as a positive electrode active material and that charge voltage (maximum voltage) was set to 5.0 V. Then, the similar measurement was performed. The result is shown in Table 2.

Example 15

A lithium secondary battery was produced in the same manner as Example 3 except that $LiNi_{0.3}Co_{0.4}Mn_{1.3}O_4$ was used as a positive electrode active material and that charge voltage (maximum voltage) was set to 5.0 V. Then, the similar measurement was performed. The result is shown in Table 2.

Comparative Examples 6 to 10

Lithium secondary batteries were produced in the same manners as Examples 11 to 15 except that a mixed solvent of EC/DMC=4/6 was used in place of the mixed solvent used in Examples 11 to 15, respectively. Then, the similar measurement was performed. These batteries were assigned as Comparative Examples 6 to 10. The result is shown in Table 2.

Comparative Examples 11 to 13

Lithium secondary batteries were produced in the same manners as Examples 16 to 18 except that a mixed solvent of EC/DMC=4/6 was used in place of the mixed solvent used in Examples 16 to 18, respectively. Then, the similar measurement was performed. These batteries were assigned as Comparative Examples 11 to 13. The result is shown in Table 3.

TABLE 2

| | Positive electrode active material | Composition | Mixing ratio (volume ratio) | Charge-discharge range (V) | Volume increase ratio (%) | Capacity maintenance ratio (%) |
|---|---|---|---|---|---|---|
| Ex. 11 | $LiNi_{0.5}Mn_{1.35}Ti_{0.15}O_4$ | EC/FP1/F-DOL1 | 2/6/2 | 4.8~3 | 4 | 75 |
| Ex. 12 | $LiNi_{0.5}Mn_{1.47}Mg_{0.03}O_4$ | EC/FP1/F-DOL1 | 2/6/2 | 4.8~3 | 5 | 74 |
| Ex. 13 | $LiNi_{0.5}Mn_{1.45}Al_{0.05}O_{3.95}F_{0.05}$ | EC/FP1/F-DOL1 | 2/6/2 | 4.8~3 | 5 | 74 |
| Ex. 14 | $LiNi_{0.4}Fe_{0.2}Mn_{1.4}O_4$ | EC/FP1/F-DOL1 | 2/6/2 | 5.0~3 | 8 | 70 |
| Ex. 15 | $LiNi_{0.3}Co_{0.4}Mn_{1.3}O_4$ | EC/FP1/F-DOL1 | 2/6/2 | 5.0~3 | 9 | 70 |
| Com-Ex. 6 | $LiNi_{0.5}Mn_{1.35}Ti_{0.15}O_4$ | EC/DMC | 4/6 | 4.8~3 | 110 | 69 |
| Com-Ex. 7 | $LiNi_{0.5}Mn_{1.47}Mg_{0.03}O_4$ | EC/DMC | 4/6 | 4.8~3 | 115 | 67 |
| Com-Ex. 8 | $LiNi_{0.5}Mn_{1.45}Al_{0.05}O_{3.95}F_{0.05}$ | EC/DMC | 4/6 | 4.8~3 | 125 | 68 |
| Com-Ex. 9 | $LiNi_{0.4}Fe_{0.2}Mn_{1.4}O_4$ | EC/DMC | 4/6 | 5.0~3 | 185 | 25 |
| Com-Ex. 10 | $LiNi_{0.3}Co_{0.4}Mn_{1.3}O_4$ | EC/DMC | 4/6 | 5.0~3 | 195 | 20 |

Ex. = Example
Com-Ex. = Comparative Example

From the results of Table 2, also in the secondary battery using any positive electrode material having a spinel type crystal structure which operates at 4.5 V or more versus lithium, it was possible to confirm that when there was used an electrolytic solution which contains a fluorine-containing cyclic ether compound represented by the formula (1) and a fluorine-containing phosphate ester compounds, effects of reducing the amount of gas generated, suppressing a volume increase ratio and improving a capacity maintenance ratio were high.

Then, a negative electrode material of the lithium ion battery was changed to perform the evaluation.

Example 16

A lithium secondary battery was produced in the same manner as Example 3 except that $Li_4Ti_5O_{12}$ was used as a negative electrode active material and that charge voltage (maximum voltage) and discharge voltage (minimum voltage) were set to 3.4 V and 2.5 V, respectively. Then, the similar measurement was performed. The result is shown in Table 2.

Example 17

A lithium secondary battery was produced in the same manner as Example 3 except that hard carbon was used as a negative electrode active material. Then, the similar measurement was performed. The result is shown in Table 2.

Example 18

A lithium secondary battery was produced in the same manner as Example 3 except that SiO was used as a negative electrode active material. Then, the similar measurement was performed. The result is shown in Table 2.

TABLE 3

| | Negative electrode active material | Electrolyte composition | Mixing ratio (volume ratio) | Charge-discharge range (V) | Volume increase ratio (%) | Capacity maintenance ratio (%) |
|---|---|---|---|---|---|---|
| Ex. 16 | $Li_4Ti_5O_{12}$ | EC/FP1/F-DOL1 | 2/6/2 | 3.4~2.5 | 2 | 90 |
| Ex. 17 | Hard carbon | EC/FP1/F-DOL1 | 2/6/2 | 4.8~3 | 2 | 86 |
| Ex. 18 | SiO | EC/FP1/F-DOL1 | 2/6/2 | 4.8~3 | 8 | 70 |
| Com-Ex. 11 | $Li_4Ti_5O_{12}$ | EC/DMC | 4/6 | 3.5~2.5 | 80 | 86 |
| Com-Ex. 12 | Hard carbon | EC/DMC | 4/6 | 4.8~3 | 40 | 75 |
| Com-Ex. 13 | SiO | EC/DMC | 4/6 | 4.8~3 | 90 | 51 |

Ex. = Example
Com-Ex. = Comparative Example

From the results of Table 3, when there was used a fluorine-containing cyclic ether compound represented by the formula (1) and a fluorine-containing phosphate ester compounds as a solvent of an electrolytic solution, it was confirmed that effects of reducing the amount of gas generated, suppressing a volume increase ratio and improving a capacity maintenance ratio were high. This is an effect resulting from a decrease in reactivity of the electrolytic solution on the side of the positive electrode which operates at a high potential, and the same effect can be expected even in a lithium secondary battery using any negative electrode.

Then, the evaluation was performed by using $Li(Li_{0.15}Ni_{0.2}Co_{0.1}Mn_{0.55})O_2$ having layered type crystal structure and $LiCoPO_4$ having olivine type crystal structure as a positive electrode material that is a positive electrode active material having crystal structure other than spinel type and that can intercalate and deintercalate a lithium ion at a potential of 4.5 V or more.

Example 19

A lithium secondary battery was produced in the same manner as Example 3 except that Li(Li$_{0.15}$Ni$_{0.2}$Co$_{0.1}$Mn$_{0.55}$)O$_2$ was used as a positive electrode active material and that charge voltage (maximum voltage) was set to 4.6 V. Then, the similar measurement was performed. The result is shown in Table 4.

Example 20

A lithium secondary battery was produced in the same manner as Example 3 except that LiCoPO$_4$ was used as a positive electrode active material and that charge voltage (maximum voltage) was set to 5.0 V. Then, the similar measurement was performed. The result is shown in Table 4.

Comparative Examples 14 and 15

Lithium secondary batteries were produced in the same manners as Examples 19 and 20 except that a mixed solvent of EC/DMC=4/6 was used in place of the mixed solvent used in Examples 19 and 20, respectively. Then, the similar measurement was performed. These batteries were assigned as Comparative Examples 14 and 15. The result is shown in Table 4.

Example 21

A lithium secondary battery was produced in the same manner as Example 3 except that Li(Mn$_{1.9}$Al$_{0.1}$)O$_4$ was used as a positive electrode active material and that charge voltage (maximum voltage) was set to 4.2 V. Then, the similar measurement was performed. The result is shown in Table 4.

Comparative Example 16

A lithium secondary battery was produced in the same manner as Example 21 except that a mixed solvent of EC/DMC=4/6 was used in place of the mixed solvent used in Example 21. Then, the similar measurement was performed. The result is shown in Table 4.

volume increase ratio and improving a capacity maintenance ratio were high. These are considered to be effects resulting from a decrease in reactivity of the electrolytic solution on the side of the positive electrode that operates at a high potential and to be common effects in the positive electrode material that operates at a high potential. Moreover, in the 4 V class battery conventionally used, a potential of about 4.3 V versus lithium is used as a positive electrode potential in the state of full charge. However, as shown in the Example 21 and Comparative Example 16, even when a fluorine-containing cyclic ether compound is used as an electrolytic solution in such a battery, there was the effect of suppressing volume increase ratio, but a prominent effect was not observed. This is considered because the usually used carbonate-based solvent of the electrolytic solution has less decomposition of an electrolytic solution and the like in the above potential range. Therefore, it is thought that it is particularly effective to use a fluorine-containing cyclic ether as a solvent of the electrolytic solution in the case of having a positive electrode which operates at a potential of 4.5 V or more versus lithium, which is higher potential than ever before.

As mentioned above, according to the present invention, even if operation is performed under high temperature environment (about 45° C.) at a high potential (4.5 V or more versus lithium), the amount of gas generated inside the battery can be reduced. Therefore, a lithium secondary battery having high energy density and excellent cycle characteristic can be provided.

Moreover, while a laminated type battery which is covered and sealed with an aluminum laminate film has an advantage of lightweight, a problem of this type battery is that when gas is generated inside the battery, appearance deformation such as swelling easily occurs, and an internal electrode lamination structure is easily damaged. However, according to the present invention, the gas generation can be suppressed and such a problem can be solved. Thus, the present invention is particularly effective for the laminated type battery covered with a laminate film.

REFERENCE SIGNS LIST

1 Positive electrode active material layer
2 Negative electrode active material layer

TABLE 4

| | Positive electrode active material | Electrolyte composition | Mixing ratio (volume ratio) | Charge-discharge range (V) | Volume increase ratio (%) | Capacity maintenance ratio (%) |
|---|---|---|---|---|---|---|
| Ex. 19 | Li(Li$_{0.15}$Ni$_{0.2}$Co$_{0.1}$Mn$_{0.55}$)O$_2$ | EC/FP1/F-DOL1 | 2/6/2 | 4.6~3 | 15 | 60 |
| Ex. 20 | LiCoPO$_4$ | EC/FP1/F-DOL1 | 2/6/2 | 5~3 | 9 | 71 |
| Com-Ex. 14 | Li(Li$_{0.15}$Ni$_{0.2}$Co$_{0.1}$Mn$_{0.55}$)O$_2$ | EC/DMC | 4/6 | 4.6~3 | 180 | 34 |
| Com-Ex. 15 | LiCoPO$_4$ | EC/DMC | 4/6 | 5~3 | 135 | 53 |
| Ex. 21 | Li(Mn$_{1.9}$Al$_{0.1}$)O$_4$ | EC/FP1/F-DOL1 | 2/6/2 | 4.2~3 | 1.5 | 84 |
| Com-Ex. 16 | Li(Mn$_{1.9}$Al$_{0.1}$)O$_4$ | EC/DMC | 4/6 | 4.2~3 | 2 | 85 |

Ex. = Example
Com-Ex. = Comparative Example

Even in the lithium secondary battery using the positive electrode material which has a crystal structure other than spinel structure and which intercalates and deintercalates a lithium ion at a high potential of 4.5 V or more versus lithium, when there was used the electrolytic solution containing the fluorine-containing cyclic ether compound represented by the formula (1) and a fluorine-containing phosphate ester compound, it was confirmed that effects of decreasing the amount of gas generated, suppressing a 3 Positive electrode current collector
4 Negative electrode current collector
5 Separator
6 Laminate outer package
7 Laminate outer package
8 Negative electrode tab
9 Positive electrode tab

The invention claimed is:
1. A secondary battery comprising:
a positive electrode capable of intercalating and deintercalating a lithium ion,
a negative electrode capable of intercalating and deintercalating a lithium ion, and
an electrolytic solution,
wherein the electrolytic solution comprises:
a fluorine-containing cyclic ether compound represented by the following formula (1):

(1)

wherein $R^1$ to $R^6$ are each independently selected from a hydrogen atom, a fluorine atom, a chlorine atom, or a fluorine-substituted, chlorine-substituted, or unsubstituted alkyl group, and at least one of $R^1$ to $R^6$ is selected from a fluorine atom or a fluorine-substituted alkyl group, and
a fluorine-containing phosphate ester compound.

2. The secondary battery according to claim 1, wherein the positive electrode contains a positive electrode active material that involves intercalation and deintercalation of a lithium ion at a potential of 4.5 V or more versus lithium metal during charge-discharge operation of the battery.

3. The secondary battery according to claim 2, wherein the positive electrode active material is an active material represented by any one of the following formulas (4), (5), and (6):

$$Li_a(M_xMn_{2-x-y}Y_y)(O_{4-w}Z_w) \quad (4)$$

wherein $0 \leq x \leq 1.2$, $0 \leq y$, $x+y<2$, $0 \leq a \leq 1.2$, and $0 \leq w \leq 1$; M is at least one selected from Co, Ni, Fe, Cr and Cu; Y is one selected from Li, B, Na, Al, Mg, Ti, Si, K and Ca; and Z is at least one of F or Cl;

$$LiMPO_4 \quad (5)$$

wherein M is at least one of Co and Ni; and $$Li(Li_xM_{1-x-z}Mn_z)O_2 \quad (6)$$

wherein $0 \leq x<0.3$ and $0.3 \leq z \leq 0.7$; and M is at least one selected from Co, Ni and Fe.

4. The secondary battery according to claim 1, wherein in the formula (1), $R^1$ to $R^6$ are each independently a hydrogen atom, a fluorine atom, an alkyl group having 3 or less carbon atoms, or an alkyl group having 3 or less carbon atoms in which a part of or all of hydrogen atoms are substituted with fluorine.

5. The secondary battery according to claim 1, wherein the fluorine-containing cyclic ether compound is 2,2-bistrifluoromethyl-1,3-dioxolane represented by the following formula (1-1):

(1-1)

6. The secondary battery according to claim 1, wherein the fluorine-containing cyclic ether compound represented by the formula (1) is contained in a solvent of the electrolytic solution in the range of 1 vol % or more and 50 vol % or less.

7. The secondary battery according to claim 1, wherein the fluorine-containing phosphate ester compound is represented by the following formula (3):

(3)

wherein $R^{31}$, $R^{32}$, and $R^{33}$ each independently represent an alkyl group having 1 to 5 carbon atoms or a fluorine-substituted alkyl group having 1 to 5 carbon atoms, and at least one of these is a fluorine-substituted alkyl group.

8. The secondary battery according to claim 1, wherein the fluorine-containing phosphate ester compound is contained in a solvent of the electrolytic solution in the range of 5 vol % or more and 95 vol % or less.

9. The secondary battery according to claim 1, wherein the electrolytic solution further comprises a cyclic carbonate compound.

10. The secondary battery according to claim 1, wherein the fluorine-containing phosphate ester compound is contained in a solvent of the electrolytic solution in the range of 30 vol % or more and 70 vol % or less.

11. The secondary battery according to claim 10, wherein the fluorine-containing phosphate ester compound and the fluorine-containing chain ether compound are contained in a solvent of the electrolytic solution in the range of 5 vol % or more and 95 vol % or less.

12. The secondary battery according to claim 1, further comprising a fluorine-containing chain ether compound.

13. The secondary battery according to claim 12, wherein the fluorine-containing chain ether compound is represented by the following formula (2):

$$R^{21}-O-R^{22} \quad (2)$$

wherein $R^{21}$ and $R^{22}$ are each independently an unsubstituted alkyl group or a fluorine-substituted alkyl group, and at least one of $R^{21}$ and $R^{22}$ is a fluorine-substituted alkyl group, and a total number of carbon atoms of $R^{21}$ and $R^{22}$ is 4 or more and 10 or less.

* * * * *

UNITED STATES PATENT AND TRADEMARK OFFICE
CERTIFICATE OF CORRECTION

PATENT NO. : 9,461,335 B2
APPLICATION NO. : 14/382429
DATED : October 4, 2016
INVENTOR(S) : Takehiro Noguchi It is certified that error appears in the above-identified patent and that said Letters Patent is hereby corrected as shown below:

In the Claims

Claim 13, Column 28, Line 53, "$(_2)$" should read -- (2) --.

Signed and Sealed this
Thirtieth Day of May, 2017

Michelle K. Lee
*Director of the United States Patent and Trademark Office*